United States Patent
Friedrich (10) Patent No.: US 7,859,387 B2
(45) Date of Patent: Dec. 28, 2010

(54) BACKSCATTER TRANSPONDER

(75) Inventor: Ulrich Friedrich, Ellhofen (DE)

(73) Assignee: Atmel Automotive GmbH, Heilbronn (DE)

( * ) Notice: Subject to any disclaimer, the term of this patent is extended or adjusted under 35 U.S.C. 154(b) by 83 days.

(21) Appl. No.: 11/315,192

(22) Filed: Dec. 23, 2005

(65) Prior Publication Data
US 2008/0136646 A1 Jun. 12, 2008

(30) Foreign Application Priority Data
Dec. 23, 2004 (DE) .................. 10 2004 062 132

(51) Int. Cl.
*H04Q 5/22* (2006.01)
(52) U.S. Cl. ............... 340/10.1; 340/572.1; 340/572.4; 340/10.4; 340/10.5; 340/10.51; 342/44; 342/51; 343/745; 343/913
(58) Field of Classification Search .......... 340/10.4, 340/10.5, 10.51, 10.52, 572.1, 572.4, 10.1; 343/745, 913; 342/42, 44, 51
See application file for complete search history.

(56) References Cited

U.S. PATENT DOCUMENTS

| | | | | | |
|---|---|---|---|---|---|
| 4,656,472 | A | * | 4/1987 | Walton | 340/10.4 |
| 5,153,583 | A | * | 10/1992 | Murdoch | 340/10.34 |
| 5,206,639 | A | * | 4/1993 | Kamens | 340/10.33 |
| 5,345,231 | A | * | 9/1994 | Koo et al. | 340/870.31 |
| 5,430,441 | A | * | 7/1995 | Bickley et al. | 340/10.2 |
| 5,446,447 | A | * | 8/1995 | Carney et al. | 340/572.4 |
| 5,523,749 | A | * | 6/1996 | Cole et al. | 340/10.34 |
| 5,649,295 | A | | 7/1997 | Shober et al. | |
| 5,774,062 | A | * | 6/1998 | Ikefuji | 340/10.4 |
| 6,044,333 | A | * | 3/2000 | Stobbe et al. | 702/106 |
| 6,111,520 | A | * | 8/2000 | Allen et al. | 340/870.16 |
| 6,342,844 | B1 | * | 1/2002 | Rozin | 340/933 |
| 6,362,731 | B1 | * | 3/2002 | Lill | 340/445 |
| 6,412,086 | B1 | | 6/2002 | Friedman et al. | |
| 6,456,668 | B1 | * | 9/2002 | MacLellan et al. | 375/283 |
| 6,486,769 | B1 | | 11/2002 | McLean | |
| 6,870,461 | B2 | * | 3/2005 | Fischer et al. | 340/10.1 |
| 7,015,826 | B1 | * | 3/2006 | Chan et al. | 340/870.17 |
| 7,068,169 | B2 | * | 6/2006 | Collins et al. | 340/572.1 |
| 7,093,765 | B2 | * | 8/2006 | Baldischweiler et al. | 235/492 |
| 7,173,519 | B2 | * | 2/2007 | Friedrich et al. | 340/10.4 |
| 7,236,092 | B1 | * | 6/2007 | Joy | 340/539.12 |
| 7,253,719 | B2 | * | 8/2007 | Diorio et al. | 340/10.4 |
| 7,280,044 | B2 | * | 10/2007 | Kubby | 340/572.7 |
| 7,348,875 | B2 | * | 3/2008 | Hughes et al. | 340/10.4 |
| 2003/0102961 | A1 | | 6/2003 | Fischer et al. | |

FOREIGN PATENT DOCUMENTS

| | | |
|---|---|---|
| DE | 102 56 099 A1 | 6/2004 |
| EP | 0 750 200 | 12/1996 |

* cited by examiner

*Primary Examiner*—Daniel Wu
*Assistant Examiner*—Son M Tang
(74) *Attorney, Agent, or Firm*—Muncy, Geissler, Olds & Lowe, PLLC (57) ABSTRACT

A backscatter transponder for an HF communication system with modulated reradiation, is provided that includes an antenna for receiving high-frequency carrier signals, wherein the antenna has reflective characteristics, a control unit for providing transponder-specific parameters, and a modulator that can be driven by the control unit. The modulator altering the reflective characteristics of the antenna in accordance with at least one transponder-specific parameter.

27 Claims, 5 Drawing Sheets

BACKSCATTER TRANSPONDER

This nonprovisional application claims priority under 35 U.S.C. §119(a) on Patent Application No. 10 2004 062 132.2 filed in Germany on Dec. 23, 2004, which is herein incorporated by reference.

BACKGROUND OF THE INVENTION

1. Field of the Invention

The invention relates to a backscatter transponder for an HF communication system with modulated reradiation.

The invention resides in the field of transponder technology and more particularly in the field of contactless communication for the purposes of identification. Although applicable in principle to any desired communication systems, the present invention and the problems it was designed to solve are explained below with respect to RFID communication systems and their applications. RFID stands for "Radio Frequency Identification."

2. Description of the Background Art

In RFID systems, typically an electromagnetic signal sent out by a base station (reader) is received and demodulated by the transponder (tag). In this context, a distinction is made between active, semi-passive, and passive transponders, depending on how their energy supply is implemented. In contrast to active transponders, passive transponders have no energy supply of their own, so the energy required in the transponder for demodulation and decoding of the received electromagnetic signal must be extracted from the very electromagnetic signal transmitted by the base station. In addition to this unidirectional transfer of energy, bi-directional data communication between the base station and transponder typically also takes place. For general background information on RFID technology, refer to the "RFID Handbuch" by Klaus Finkenzeller, Hanser Verlag, third revised edition, 2002, which was translated in English by John Wiley & Sons.

In most UHF and microwave based RFID systems or sensor systems, bidirectional data communication between base station and transponder is first initiated by the base station in that the base station transmits a query signal (command, data request) to the various transponders located in the vicinity of the base station. The transponder or transponders participating in the data communication typically react to this query with a response signal (response).

The method known as the backscatter technique is one method used for return data transmission from the transponder back to the base station. Such transponders are referred to below as backscatter transponders. In this method, first the base station emits high-frequency electromagnetic carrier signals, which are received and processed by the transmitting and receiving device in the transponder. In addition, the received signals are modulated with a customary modulation method and are scattered back using the backscatter cross-section of the transponder's transmitting/receiving antenna.

European patent EP 750 200 B1, which corresponds to U.S. Pat. No. 5,649,295, describes a prior art RFID communication system in which the return data transmission takes place with the use of the backscatter method. In this system, the base station transmits a first piece of information to at least one transponder of the communication system, the transponder(s) receive the signal transmitted by the base station, decode it, and take the first piece of information from it. The transponders also have a backscatter modulator; the backscatter modulator modulates the backscattered signal, which is derived from the signal transmitted by the base station. This modulation uses a second piece of information, which is derived from the first piece of information of the transmitted signal. The content of the second piece of information in the backscattered signal includes the data rate or the modulation for the signals backscattered by the transponder, for example.

At times, there is a need for a rapid and maximally effective test capability for such transponders, in order to thereby determine one or more transponder-specific parameters that can provide information concerning the quality, performance, functionality, etc. of the transponder. A very important transponder-specific parameter, which provides information about the overall RFID system in addition to the transponder itself, is the effectiveness of the transponder's rectifier. To a first approximation, the effectiveness of the rectifier describes the ratio of the useful signal picked up by the transponder to the transmit signal transmitted by the base station. Since only an indication of the losses in the transmission path of the electromagnetic wave is typically obtained in this way, it is of course necessary to also take the ratio of the DC power at the output of the rectifier to the useful signal picked up in order to determine the actual rectifier effectiveness.

If the transponder or the rectifier has many parasitic components on the receive side, the effectiveness of the rectifier drops. It is important to be able to identify precisely these transponder-specific parameters as accurately as possible in order to evaluate the quality and performance of a given transponder.

Additional transponder-specific parameters include the modulation amplitude of the modulator, which is a function of the voltage extracted by the transponder from the electromagnetic field and which significantly influences the backscatter behavior, the voltage extracted from the external electromagnetic field, the receive quality, and the like.

These transponder-specific parameters of a UHF-based or microwave-based RFID systems can be determined in any of several ways.

The transponder-specific parameters may be determined statically, for example. In this method, the transponder-specific parameter or parameters desired in each case are measured and analyzed by the transponder itself. The analyzed parameters are then written to a register or memory internal to the transponder. Subsequent to the testing, the stored transponder-specific parameters can be read out by an external reader device. However, this method is extraordinarily expensive, since it is necessary to provide a transponder specifically intended for this purpose which has appropriate analysis and storage devices. Since the passive and semipassive transponders that are customarily used do not have transponder-internal test devices for the sole purpose of testing, not least for reasons of cost, transponders so equipped would be complicated in terms of circuit design, and thus cost-intensive. Furthermore, only a static test would be possible with this type of transponder test, since the data acquired could only be read out and analyzed subsequent to the test. The option of dynamic testing in a varying electromagnetic field is not possible here.

In addition to the aforementioned static test, it is also possible to determine the transponder-specific parameters dynamically, which is to say during the operation of a transponder. In the dynamic test, test equipment connected by wires is clamped to connections of the backscatter transponder. However, the clamped-on connecting lines act as antennas which likewise contribute to backscattering a part of the electromagnetic field transmitted by the base station. If the power of the electromagnetic signal radiated by the base station is relatively high, as in the case of passive transponders, the connecting lines, acting as antennas, must be expected to cause corresponding feedback effects on the circuitry of the analysis circuit. This leads to more or less altered and thus erroneous measurement results. Consequently, the results of this dynamic test in the electromagnetic field of the transponder system are not very reliable.

Thus, in current backscatter-based transponder systems there are no simple ways to reliably determine the aforementioned transponder-specific parameters in a UHF or microwave field. There exist only minimal tests where the transponder responds to a query signal transmitted by the base station by sending back data, which then only provide an indication of whether the modulator of the transponder is on or off. However, it is not possible to evaluate the transponder's performance, the effectiveness of its receiving device, or the like.

SUMMARY OF THE INVENTION

It is therefore an object of the present invention to provide an improved and, in particular, more reliable, test option for transponder-specific parameters.

Accordingly, a backscatter transponder for an HF communication system with modulated backscattering is provided that has an antenna for receiving high-frequency carrier signals, wherein the antenna has reflective characteristics, that has a control unit for providing transponder-specific parameters, and that has a modulator that can be driven by the control unit, the modulator being designed to alter the reflective characteristics of the antenna in accordance with at least one transponder-specific parameter.

The modulator present in the backscatter transponder can be used, according to the invention, not only for return data transmission from the transponder to the base station, but also for transmission of transponder-specific parameters in a test mode. These transponder-specific parameters, which are discussed in detail below, include status quantities, test quantities, and other quantities, which characterize the function of the transponder as well as the data communication of the transponder with the base station.

The transponder, or more specifically its modulator, has a first operating mode in which the data communication between the base station and transponder takes place in a conventional manner, in which data are transmitted in half-duplex or full-duplex mode from the base station to the transponder and corresponding response signals are transmitted back to the base station from the transponder. In addition to this first operating mode, the transponder can also be operated in a second mode known as a test mode. In this test mode, the transponder determines the aforementioned transponder-specific parameters, analyzes them if applicable, and transmits corresponding signals back to the base station, with the analysis of these returned signals in the base station allowing conclusions to be drawn concerning the transponder-specific parameters.

The transponder can be designed as a backscatter transponder in which the transponder can utilize the backscatter cross-section of its transmitting/receiving antenna to transmit signals back to the base station as long as the transponder is located in an electromagnetic field. It is also important that the transponder, in order to determine the transponder-specific parameters, has a sensor device that determines the transponder-specific parameters and forwards them to a control unit. In the test mode, the control unit controls the modulator in such a manner that the reflection characteristics are changed in accordance with a control signal derived from at least one transponder-specific parameter. The particular advantage of the inventive solution is that the transponder-specific parameters determined by the sensor device are transmitted to the base station in this very simple and elegant manner without being distorted by any additional test antennas or other test devices and/or by undesired reflections. The base station is thus in a position to analyze the signals transmitted by the transponder in the test mode and to draw very highly reliable conclusions from the signals concerning the applicable transponder-specific parameters.

In an embodiment of the present invention, for the purpose of changing the reflective characteristics of the antenna, the control unit generates a control signal, which serves to control the modulator. This control signal contains information on at least one transponder-specific parameter.

In another embodiment of the present invention, the control unit has an oscillator with frequency control. A voltage signal that characterizes a transponder-specific parameter can be supplied to the oscillator as a control quantity to set the oscillator frequency. The result is thus a very simple and elegant solution for transmitting the determined transponder-specific parameter to the base station, wherein this parameter, which is present in analog or digital form, is used as a control quantity for setting the frequency of the oscillator. The oscillator converts this transponder-specific parameter, which is present in analog or digital form, into a specific frequency corresponding to the relevant parameter value. The oscillator controls the modulator with this frequency signal, with the reflection characteristics of the antenna being changed as a function of the frequency signal provided to the modulator. The base station analyzes the sidebands (subcarriers) of the signal backscattered by the antennas of the transponder, and can determine the frequency of the oscillator signal and thus the transponder-specific parameter from the spectral location of the sidebands.

In this connection, the oscillator can be designed as a voltage-controlled oscillator (VCO) or current-controlled oscillator (ICO). With this type of oscillator, a voltage or current signal derived directly from the relevant transponder-specific parameter can be used as the analog control quantity.

One transponder-specific parameter for which precise knowledge is especially important is the supply voltage extracted by the transponder from the high-frequency electromagnetic field. Knowledge of the extracted supply voltage can be used to draw conclusions concerning the effectiveness of the receive-side rectifier of the transponder. This rectifier can be designed with a single stage or with multiple stages. In this regard, the supply voltage extracted from the electromagnetic field is a measure of the effectiveness of the rectifier located in the transmitting/receiving device of the transponder. The effectiveness of the rectifier is calculated from the ratio of the received useful signal to the signal transmitted by the base station. The base station typically transmits with an output power of a few watts. The higher the extracted voltage is, the higher the effectiveness of the rectifier for equal distances of the transponder from the base station. A comparatively low effectiveness results when, for example, the transmitting/receiving device or the rectifier contained therein has a large number of parasitic elements.

In addition to knowledge of the extracted supply voltage, other transponder-specific parameters such as the band gap voltage, the RSSI output voltage, and the like, also play a role. The band gap voltage is very constant, and can thus be used as a comparison quantity and/or reference quantity.

To supply energy to the transponder, the transponder has a power supply device, which produces a supply voltage from the electromagnetic carrier signal received by the antenna. This supply voltage can be present as a stabilized supply voltage and/or as a rectified supply voltage. In order to determine the supply voltage extracted from the electromagnetic field, this supply voltage produced by the power supply device, or a previously derived voltage signal, is used as a control signal. The stabilized and/or rectified supply voltage now serves as a control quantity for controlling the (voltage-controlled) oscillator. From this, the oscillator produces a frequency signal at its output, with the frequency of this frequency signal being a function of the stabilized and/or rectified supply voltage. The base station is now in a position to obtain frequency information about the frequency signal, and thus directly obtain information about the supply voltage and its dynamics, by measuring the sidebands of the back-scattered signal.

A divider device with a first number of divider stages can be arranged between an output of the oscillator and a control output of the modulator which follows this oscillator. The divider device is designed to divide down an oscillator frequency produced by the oscillator.

The divider device can have a reset device by which the divider device can be reset when the signal falls below a certain level. To this end, the divider device typically has a control input for coupling in a POR control signal (POR=power on reset) that can be used to set a threshold at which the divider device is reset. In this embodiment, the frequency signal produced by the oscillator is first fed to a subsequent frequency divider. If this frequency divider is reset when a voltage drops below a certain level, an analog or digital threshold of a transponder-specific parameter can be measured. In addition, the load can be reduced by the rapid back-and-forth switching of the modulator, so that load conditions corresponding to a typically used normal operating mode are also produced here. In a very advantageous expansion stage of this test mode, other analog signals can be measured instead of the POR control signal in that the clock of the frequency signal produced by the oscillator is switched off or is used as the POR signal for a counter.

In an advantageous embodiment, the modulator is designed as a backscatter modulator or as a load modulator, and has a variably adjustable load coupled to the antenna. By varying this load, the backscatter cross-section of the antenna can be changed, thus setting the reflection characteristics of the antenna, in a manner that is known per se.

In an embodiment, the modulator has a capacitively variable load, wherein the phase angle of a signal backscattered by the antenna is changed by changing the capacitance of the capacitive load. This phase change can then advantageously be detected by the base station as a useful signal.

In another embodiment, the capacitively variable load is designed as a controllable varactor, whose capacitance is thus adjustable by a control quantity. Especially advantageous are CMOS-compatible control varactors whose controllable gate capacitances are part of a CMOS transistor, for example. Similarly advantageous are the devices known as CMOS accumulation mode varactors, which is to say MOSFETs with a short-circuited drain-source load path that can be driven against the gate electrode of the MOSFET. This type of varactor is characterized by very high quality, and thus increases the communication distance of the transponder to the base station. In this regard, the capacitively variable load or the controllable varactor can advantageously be controlled by a control unit with which it is possible to apply a control voltage through the variable part of the capacitively variable load. In this way, it is possible to achieve at least two, and in the ideal case any desired number of, different phase angles of the backscattered signal.

In another, similarly advantageous embodiment, the capacitively variable load is embodied as a micromechanical component that acts capacitively within the modulator. The micromechanical component is then controlled by external environmental conditions such as the ambient temperature of the transponder, the ambient pressure of the transponder, etc., resulting in a very simple sensor function. A change in the ambient temperature or ambient pressure results in a capacitance change in the micromechanical component. This capacitance change can then be used as the control signal for the modulation. In place of the ambient temperature and ambient pressure, it is also possible to conceive of other environmental conditions and control quantities whose changes result in a capacitance change in the micromechanical component.

A separate sensor device can be provided that is coupled to the control unit and supplies the measured sensor data to the control unit. The separate sensor unit thus does not directly act on the modulator. The sensor device can also be embodied as a separate integrated circuit, which is powered by the supply voltage extracted from the electromagnetic field, for example.

The sensor device can also be integrated on a single semiconductor chip with a transmitting/receiving device. By integrating the sensor device on a chip together with the other components of the transmitting/receiving device of the transponder, the complicated and power-consuming pad driver circuits are eliminated. This sensor device can also be implemented for passive transponder applications. However, it can be problematic in this regard that this makes continuous acquisition of the sensor data more difficult. For these reasons it is advantageous to combine a supply voltage extracted from the electromagnetic field with a supply voltage provided by the (semipassive) transponder. This can be implemented in a very simple manner in that at least one component of the transmitting/receiving device is continuously powered by the external supply voltage. The power supply to at least one component of the transmitting/receiving device is controlled by a regulator circuit in this context. If the supply voltage that is extracted from the electromagnetic field is sufficient, these components are supplied with power by the extracted supply voltage. The aforementioned components of the transmitting/receiving device can advantageously be the sensor device. In this way it is ensured that the sensor device is always supplied with energy, and thus that continuous acquisition of the sensor data is possible. Another option for providing the energy supply for the sensor device results when the aforementioned combined power supply of the transmitting/receiving device contains a charging device that is part of the control unit. This makes it possible to charge a storage battery of the transponder as long as the transponder is located in an electromagnetic field.

In another embodiment, the sensor device has at least one capacitively and/or ohmically acting sensor.

In the case of an ohmically acting sensor, a current that is to be measured can be sensed and analyzed by the sensor. However, the resistance change of the ohmic sensor can also be sensed through a voltage measurement, for example with the aid of a voltage divider. For example, if the ambient temperature is to be sensed, then sensor elements are provided whose properties are influenced by the temperature. For instance, a sensor element with a pn junction can be provided in which the voltage across the pn junction is temperature-dependent. This temperature dependence of the voltage across the pn junction of the sensor element can be analyzed with an analysis circuit arrangement that is generally known. After appropriate analysis, for example by the aforementioned oscillator, this voltage can be transmitted back to the base station using backscattering where it can be analyzed by the base station.

If the sensor acts capacitively and if the change in capacitance of the sensor cannot be directly used for modulation control of the modulator, there exists the option of generating a sensor signal voltage with the aid of the capacitance change in the sensor through control of the sensor device with a specific frequency. For example, this is possible when the current is measured by the capacitively acting sensor and is analyzed and stored in appropriate form after conditioning of the signal. In this way it is possible to transmit the measured value back to the base station as a series of values and/or in digital form using backscattering. Additionally or alternatively, it is also possible to measure a current using the capacitively acting sensor and to supply this current to the modulator in a suitable form after conditioning of the measured current signal. This can be implemented in turn by a current-controlled or voltage-controlled oscillator. The capacitively acting sensor can also be designed as a capacitive voltage divider that contains at least one adjustable capacitance. The voltage arising across the elements of the capacitive voltage divider as a result of the variable capacitance can then be analyzed by the control unit, for example using an A/D converter.

In addition, the ohmically or capacitively acting sensor can also be a component of a measurement bridge circuit. The measurement bridge voltage arising through the change in the ohmic or capacitive component can be transmitted back to the base station through backscattering after appropriate processing in the control unit. Additionally or alternatively, the capacitively acting sensor can also be designed as a differential capacitor and can be used in what is known as a CCRR measurement bridge. In this application, when an AC voltage is applied, an amplitude-modulated measurement voltage is produced which can likewise be used as a modulation-control voltage after analysis by the control unit.

If the capacitively or ohmically acting sensor is used to set a specific frequency of an oscillator, the frequency produced by the oscillator can be supplied to a subsequent frequency-to-voltage converter. A simple circuit for this purpose is a low-pass filter or a high-pass filter. These filters can be implemented by a simple circuit through a combination of resistors and capacitors. A further possibility results when the frequency produced by the oscillator acts on the subsequent modulator as a pulse-width modulated signal by appropriate divider circuits.

The capacitively or ohmically acting sensor can also be used to set a predefined time period of a monostable multivibrator. This predefined time period can then be used to act on the modulator in the form of a modulation change. By this means, a synchronization or triggering of the multivibrator by the base station is possible. The monostable multivibrator can also be triggered by a control unit of the transmitting/receiving device.

In another embodiment the sensor device can have at least one sensor acting as a current source and/or as a voltage source. If the sensor acts as a current source or as a voltage source, the measured sensor signal can be used directly or even indirectly, for example in a time-offset manner on command from the base station, to influence a phase modulation (PSK modulation) of the modulator. An indirect possibility is also provided when the sensor signal produced by the sensors is used to frequency shift an oscillator. The frequency signal the oscillator produces at its output can then be supplied to a subsequent frequency-to-voltage converter which is embodied in a very simple design as a low-pass or high-pass filter, for example as a simple RC filter.

An additional control unit can also be provided that controls the control unit and that sets a modulation signal generated by the modulator such that the transponder can communicate with a base station. The additional control unit serves to control the actual data communication between transponder and base station.

In a further embodiment, the control unit can be part of the additional control unit. In this context, the additional control unit can be designed as a program-controlled device, for example as a microprocessor or microcontroller. For a transponder it is advantageous when a microprocessor with a relatively low bit rate, for example a four-bit microprocessor, is used as the program-controlled device. In addition, it would also be conceivable for the control unit and/or the additional control unit to be designed as a programmable or non-programmable logic circuit, for example as a PLD circuit or as an FPGA circuit.

In another embodiment of the present invention, the transponder can have a transmitting/receiving device that represents the external interface of the transponder. The transmitting/receiving device contains the antenna, designed as a transmitting/receiving antenna, and the modulator, wherein the transmitting/receiving antenna is provided to receive high frequency carrier signals from an electromagnetic field produced by a base station and to transmit appropriate response signals back.

In a further embodiment, the transmitting/receiving antenna can have an RSSI circuit for providing an RSSI voltage. The RSSI voltage here can also be used as a transponder-specific parameter.

In another embodiment, the transmitting/receiving device can have a rectifier path in which a rectifying element, in particular a rectifier diode, is present to provide a rectified voltage.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

In the drawings, like or functionally like elements and signals are identified with the same reference labels, unless otherwise specified.

Figure 1:
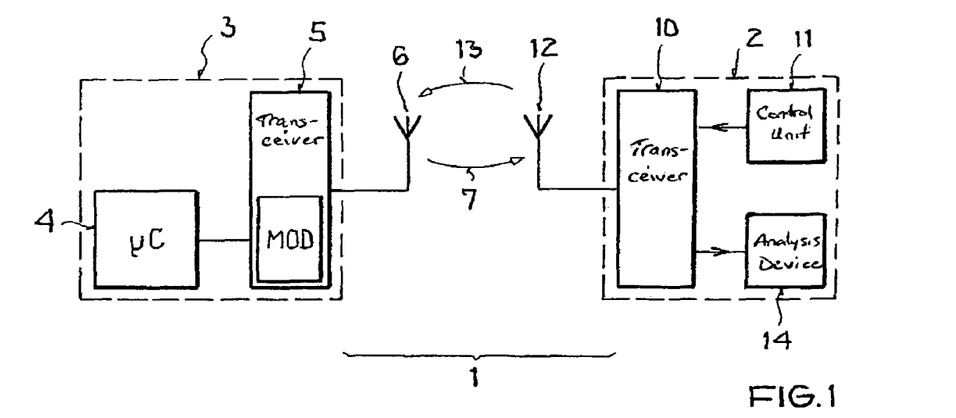
FIG. 1 is a block diagram representing an RFID system with a base station and a transponder communicating with this base station, according to an embodiment of the present invention.

FIG. 1 uses a block diagram to show the conceptual structure of an RFID system with a base station and a transponder communicating with this base station.

The communication system labeled with reference symbol 1 has a base station 2 and a transponder 3, for example, a backscatter transponder. Base station 2 and transponder 3 are in communicative connection here. The communication system 1, which is an RFID system for example, can be designed as a so-called master/slave communication system in which the base station 2 functions as the master and the transponder or transponders 3 each function as slaves.

The transponder 3 includes a control unit 4, a transmitting/receiving device 5, and a transmitting/receiving antenna 6. The transmitting/receiving device 5, which is coupled to the control unit 4 and to the transmitting/receiving antenna 6, contains a modulator which is merely indicated here. Its mode of operation is described in detail below in conjunction with FIGS. 2-4. It is assumed that the transmitting/receiving antenna 6 of the backscatter transponder 3 has reflective characteristics, wherein the reflective characteristics of the transmitting/receiving antenna 6 can be changed by the modulator of the transmitting/receiving device 5.

The base station 2 has a transmitting/receiving device 10 (transceiver) and a control unit 11 for controlling data communication. The transmitting/receiving device 10 of the base station 2 is designed to transmit high-frequency carrier signals 13 through the antenna 12 to the antenna 6 of the transponder 3. In the same manner, the transmitting/receiving device 5 of the transponder 3 is designed to transmit corresponding response signals 7 back to the base station 2 in response to the transmitted signals 13 in full-duplex or half-duplex operation.

Control of the respective data communication is by the base station control unit 11 and the transponder control unit 4. The control units 4, 11 are designed as microcontrollers, for example.

The base station additionally has an analysis device 14. The analysis device 14 is arranged in the receive path of the base station 2 and is arranged following the receiver. In a test operation, the signals transmitted from the transponder 3 by backscattering, and thus the transponder-specific parameters, are analyzed by the analysis device 14. In the present example embodiment, the analysis device 14 is shown as a separate functional unit for the purpose of a clearer representation.

Figure 2:
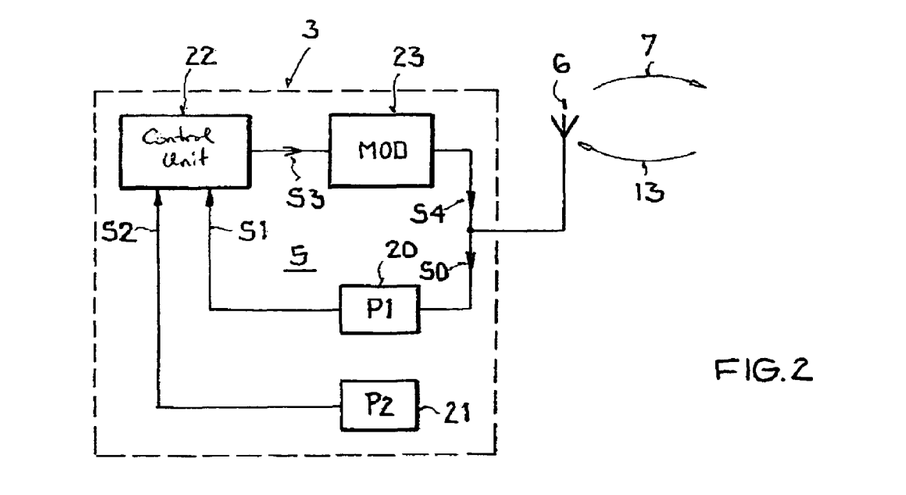
FIG. 2 is a block diagram to illustrating a transponder according to an embodiment of the present invention.

FIG. 2 shows an example embodiment of a transponder 3 via a schematic block diagram.

In the transponder 3, only the transmitting/receiving device 5 is shown; in other words, for the sake of clarity the other components of the transponder 3, in particular its control unit 4, are not shown. In the present example embodiment, the transmitting/receiving device 5 of the transponder 3 has two sensors 20, 21. The first sensor 20 is arranged in the receive path of the transponder 3 and its input is connected to the transmitting/receiving antenna 6 so that electromagnetic signals received by the transmitting/receiving antenna 6 can be delivered to the first sensor 20. The outputs of both sensors 20, 21 are connected to a control unit 22. The transponder 3 also has a modulator 23 whose control connection is controlled by the control unit 22 and whose output is connected to the transmitting/receiving antenna 6.

The two sensors 20, 21 are designed to sense transponder-specific parameters P1, P2. The first sensor 20 is designed to sense a transponder-specific parameter P1 that is derived from the received electromagnetic signal 13, whereas the second sensor 21 is designed to sense a transponder-specific parameter P2 that is independent of this signal 13. The two sensors 20, 21 produce at their outputs signals S1, S2, which contain information about the transponder-specific parameters P1, P2 sensed by the respective sensors 20, 21. As a function of these signals S1, S2, and thus of the corresponding transponder-specific parameters P1, P2, the control unit 22 produces a control signal S3 to control the subsequent modulator 23. As a function of this control signal S3, the modulator 23 changes the reflective characteristics of the transmitting/receiving antenna 6, for example by changing its backscatter cross-section. The backscatter cross-section can be affected, for example, by a change in an ohmic and/or capacitive load that is coupled to the antenna 6. The signal 7 backscattered by the transmitting/receiving antenna 6 can thus be varied as a function of the reflective characteristic of the transmitting/receiving antenna 6, which is set by the modulator 23, and hence contains information about the relevant transponder-specific parameter P1, P2.

Figure 3:
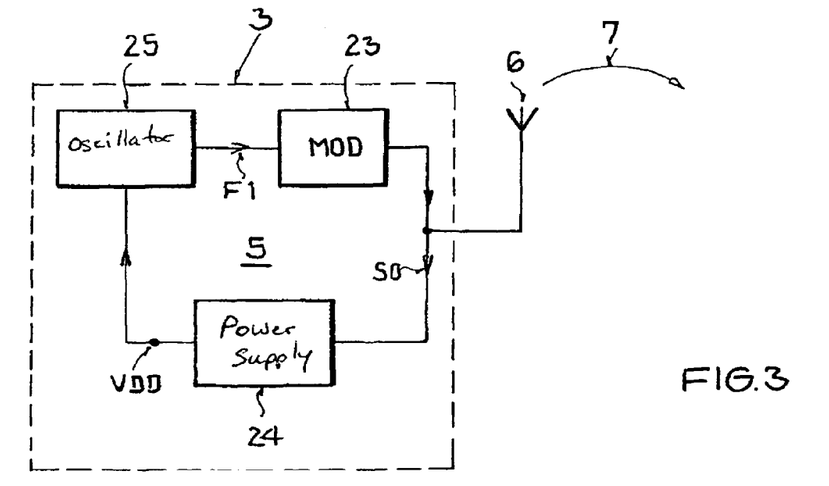
FIG. 3 illustrates a first example of a transponder with modulator control according to an embodiment of the present invention.

FIG. 3 shows a first example embodiment of an inventive transponder from FIG. 2.

In the present example embodiment from FIG. 3, the transponder 3 has a power supply 24, whose output is connected to the transmitting/receiving antenna 6. At its output the power supply 24 produces, from the transmit signal S0 coupled in through the transmitting/receiving antenna 7, a stabilized output voltage VDD. The power supply 24 is followed by an oscillator 25 with the capability of frequency control, wherein the stabilized output voltage VDD produced at the output of the power supply 24 is used as a control quantity for the oscillator 25. As a function of the value of the stabilized output voltage VDD, the oscillator 25 produces a frequency signal F1 at its output, whereby the oscillator frequency f1 of the frequency signal F1 is a function of the stabilized supply voltage VDD, or in other words:

$$f1 = f(VDD).$$

The modulator 23 following the output of the oscillator 25 is stimulated by the frequency signal F1 so that a load or impedance of the modulator 23 is changed as a function of the frequency f1 of the frequency signal F1. In the present example embodiment, the modulator 23 is designed as a load modulator or backscatter modulator 23 with which the ohmic and/or capacitive load, and thus also the backscatter cross-section of the transmitting/receiving antenna 6 connected to the modulator 23 can be varied.

By exploiting the reflective characteristics of the transmitting/receiving antenna, signals 7 are scattered back to the base station 2, where they are analyzed. A variation in the reflective characteristics of the transmitting/receiving antenna effects a change in the backscatter behavior in phase and/or amplitude, which is expressed in a variation in the amplitude of the sidebands (subcarriers) of the backscattered signal 7. By analysis of the precise spectral position of these sidebands, it is possible to deduce the frequency f1 of the frequency signal F1 produced by the oscillator 25 and thus, since this frequency f1 is a function of the extracted output voltage VDD, to deduce this extracted output voltage VDD. If this output voltage VDD is known, the efficiency of a rectifier (not shown in FIG. 3) located in the transponder-side receive path can be determined.

In another embodiment, as an alternative to the power supply 24, an RSSI circuit (RSSI=received signal strength indicator) may be provided in place thereof or in addition thereto, the circuit providing an RSSI voltage at its output (not shown in FIG. 3). In the same manner as in the example embodiment in FIG. 3, this RSSI voltage can be used as the control quantity for the oscillator 25 and, by frequency control of the modulator 23, can in this way be analyzed by the base station 2.

The oscillator 25 in the present example embodiment is designed as a voltage-controlled oscillator 25 (VCO), and hence is controlled at its input by a voltage signal VDD. Instead of the voltage-controlled oscillator 25, a current-controlled oscillator (ICO) that is controlled by a current signal would also be possible; however, in the example embodiment shown here in FIG. 3, an additional device would be needed for converting the voltage signal VDD into a corresponding current signal.

Figure 4:
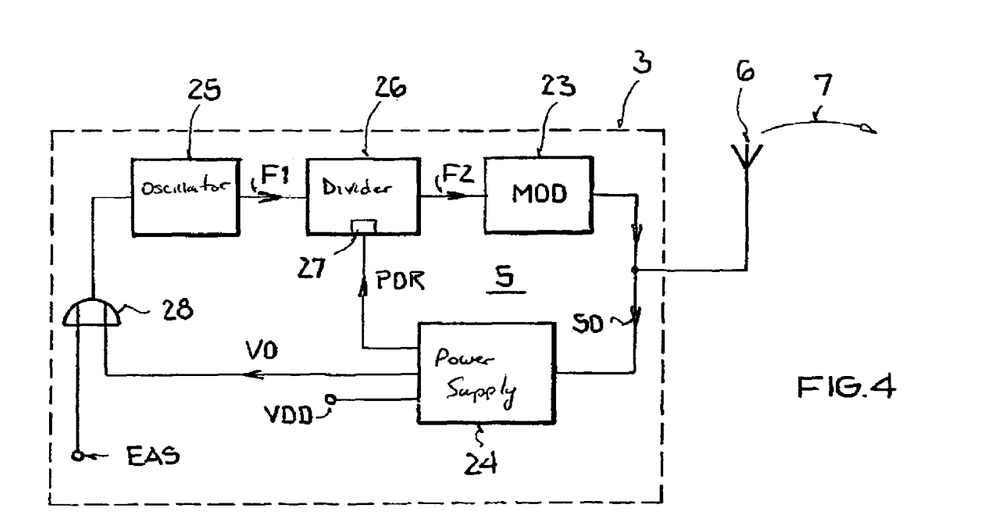
FIG. 4 illustrates a second example of a transponder with modulator control according to another embodiment of the present invention.
Figure 5:
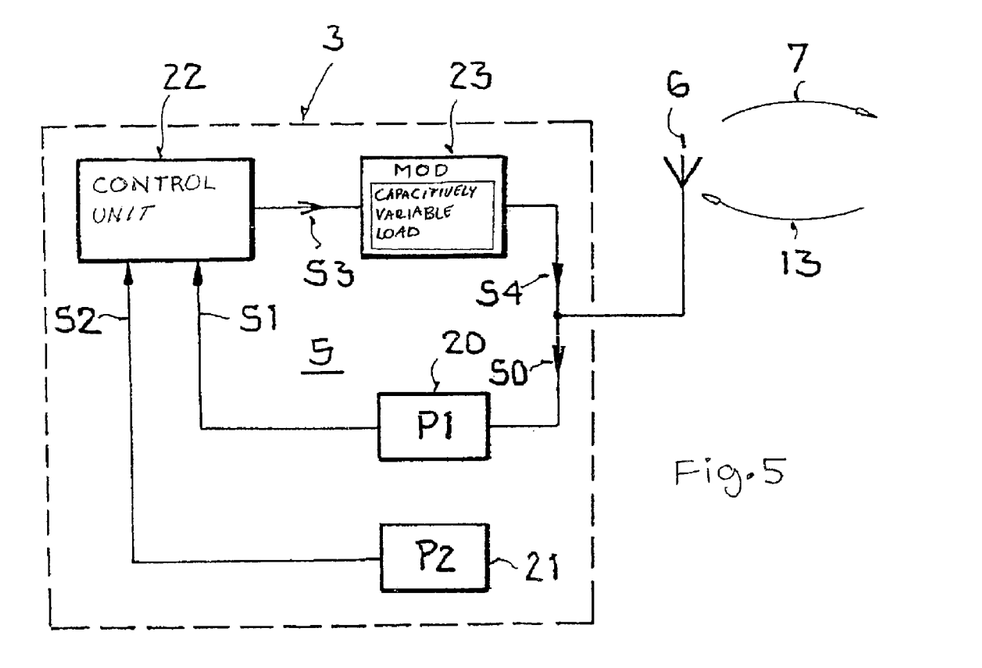
FIGS. 5-7 illustrate internal components of the modulator according to embodiments of the present application.
Figure 6:
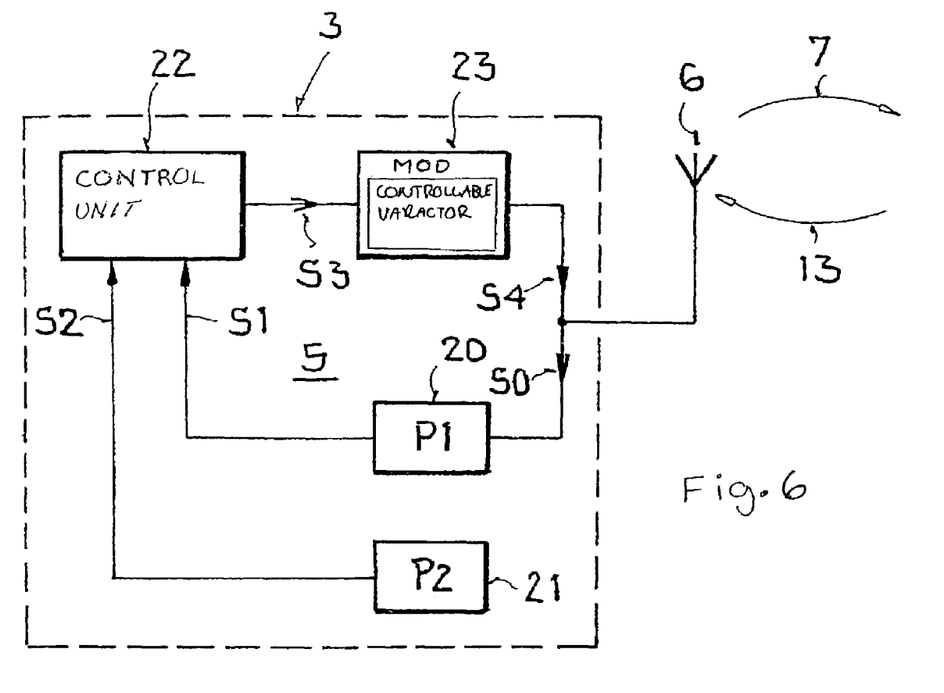
Figure 7:
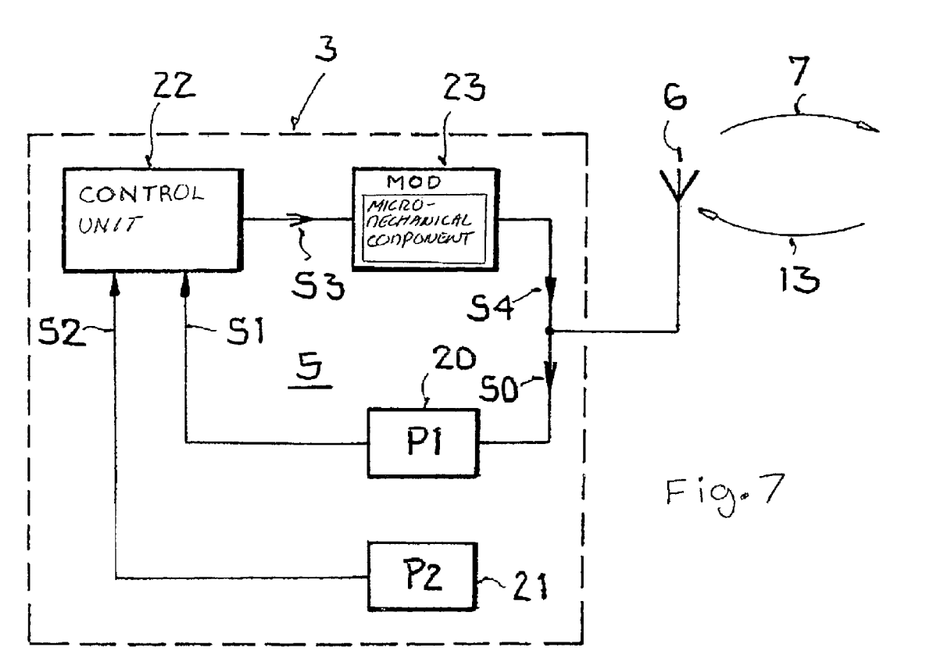

FIG. 4 shows another example embodiment of an inventive transponder.

Arranged between the oscillator 25 and the following modulator 23 is a divider device 26, for example a multistage divider. The frequency signal F1 of the oscillator 25 is supplied to this divider 26. From this signal, the divider 26 creates the divided-down frequency signal F2. The divider 26 also has a control input 27, into which a control signal POR (POR=power on reset) can be coupled. A POR threshold of the divider 26 can be set via the control signal POR.

In the present example embodiment, the control signal POR is produced by the power supply 24. In addition to the stabilized output voltage VDD, the power supply 24 produces a rectified output voltage signal V0 that serves as a control quantity for setting the frequency of the oscillator 25. Also provided between the power supply 24 and the oscillator 25 is an OR gate 28, which is intended to characterize the operating mode of the transponder 3. The rectified output signal V0 and also a control signal EAS (EAS=electronic article surveillance) are delivered to the input of the OR gate 28. By using such an OR gate 28, the transponder 3 can also be enhanced with an EAS functionality in that, insofar as permitted by the spectrum (RF regulations), the receive circuit 5 of the transponder 3 is also activated for article security. Thus, information concerning whether or not the transponder has already been invalidated is transmitted as the transponder-specific parameter here.

The example embodiments shown in FIGS. 2-4 serve merely to explain a test mode for determining transponder-specific parameters. These illustrated example embodiments, however, do not illustrate a method of operation of the transponder 3 in the case of bidirectional data communication between the base station 2 and transponder 3 using forward and return links.

In addition to the above example embodiments of an inventive transponder 3, its method of operation can also be extended or altered as follows:

The transponder 3 receives its commands through symbols radiated by the base station. In order to ensure that these are also received and analyzed as such, the received signal 7 serves, for example, as a trigger quantity and triggers a change in the modulation in the modulator 23. The modulation can then be reset after a certain period of time when the received symbol of the signal 7 has been turned off. In this way, the initiation and also the switchoff of the receiving process can be followed. The measurement is important because the detection circuit for detecting a field strength gap (notch) is different on account of the different field strength. Such methods also permit the measurement of the local field strength of the electric field, for example through fading effects.

In accordance with the invention, appropriate test modes have been implemented in the transponder 3 to permit measurement of the parameters specific to the transponder 3 under load. To this end, the transponder 3 receives the signals transmitted by the base station 3, and also carries out the corresponding command sequences. Throughout the entire sequence, the base station 3 is also in a position to track the transponder-specific parameters, for example through the behavior of the load. Another option for sensing these transponder-specific parameters results from the fact that the load is, for example, simulated by a resistor at the output of a rectifier located in the transmitting/receiving device. In order to permit exact measurements, a quantity resulting from a reference is sent back at a fixed predefined point in time, for example upon receiving the first command.

Although the present invention has been described with the aid of a preferred example embodiment, it is not limited thereto, but instead can be modified in a variety of ways.

In particular, the invention is not limited exclusively to RFID systems, but instead can of course be expanded, for example to item identification. It is frequently unnecessary to identify individual items. In such cases, it is generally also sufficient to rule out the presence of an incorrect item, for example. This is generally also called non-unique item identification. When the transponder is operated in this context, it has the function of a remote sensor. Therefore, the invention also explicitly applies to such sensors in which communication is performed to read and write data in a data carrier or sensor. As an example of such a remote sensor application, consider a temperature sensor, a pressure sensor, or the like.

In FIGS. 1-4, the structure of the RFID system, and in particular that of the transponder, was intentionally represented in an extremely simplified manner for the sake of clarity. It is self-evident that the base station and the transponder contain the functional units for data communication between the base station and transponder, such as demodulator, power supply, synchronizing device, decoder, and the like.

In FIGS. 2-4, a distinction was drawn in each case between the sensor device and the control unit for controlling the modulator. It is self-evident that the sensor device can also be part of the control unit. Moreover, it would be possible for the sensor device itself to represent the control unit, for example when the quantities measured by the sensor device can themselves serve as control signals for controlling the modulator.

It is also noted that the base station 2 can be a mobile or handheld base station, or can be integrated into other devices, such as radio telephony devices. Also, the transponder 3 can be integrated into or fixedly attached to various objects.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A transponder for a HF communication system, the transponder comprising:
   an antenna for receiving high-frequency carrier signals, the antenna having reflective characteristics;
   a transponder operational unit for providing an output to place said transponder in a first operating mode or a second test mode as a function of said output,
   a control unit for providing at least one transponder-specific parameter, which provide information relating to the quality, performance, or functionality of the transponder when said transponder is operating in said second test mode; and
   a modulator being controlled by the control unit, the modulator altering the reflective characteristics of the antenna in accordance with the at least one transponder-specific parameter, wherein the transponder, when operating in said first operating mode transmits data between a base station and the transponder, and wherein the transponder, when operating in said second test mode, transmits the at least one transponder-specific parameter to the base station, wherein in said second test mode the reflective characteristics of the antenna are modified thereby providing said base station with the information relating to the quality, performance, or functionality of the transponder.

2. The transponder according to claim 1, wherein, in order to change the reflective characteristics of the antenna, the control unit generates at least one control signal for controlling the modulator.

3. The transponder according to claim 1, wherein the control unit has at least one oscillator having frequency control, wherein a voltage signal that characterizes a transponder-specific parameter is supplied to the oscillator as a control quantity to set the oscillator frequency, and wherein the oscillator produces therefrom a control signal at its output.

4. The transponder according to claim 3, wherein the oscillator is a voltage-controlled oscillator or a current-controlled oscillator.

5. The transponder according to claim 3, wherein a supply voltage extracted from an electromagnetic field and/or a band gap voltage and/or an RSSI output voltage is provided as the voltage signal for characterizing transponder-specific parameters.

6. The transponder according to claim 3, further comprising a power supply device for supplying energy to the transponder, the power supply device being designed to extract a supply voltage from an electromagnetic field surrounding the transponder, wherein the control unit obtains the control signal from the extracted supply voltage.

7. The transponder according to claim 6, wherein the power supply device produces a stabilized and/or rectified supply voltage.

8. The transponder according to claim 3, further comprising a divider device having a first number of divider stages, the divider device being arranged between an output of the oscillator and a control output of the modulator, which follows the oscillator, the divider device dividing down an oscillator frequency produced by the oscillator in order to provide a divided-down control signal.

9. The transponder according to claim 8, wherein the divider device has a reset device that resets the divider device when a signal level falls below a threshold.

10. The transponder according to claim 9, wherein the reset device has a control input for coupling in a POR control signal, which sets the threshold at which the divider device is reset.

11. The transponder according to claim 1, wherein the modulator is a backscatter modulator or a load modulator, and has a variably adjustable load coupled to the antenna, and wherein a backscatter cross-section of the antenna can be changed by varying this load.

12. The transponder according to claim 11, wherein the modulator has a capacitively variable load, and wherein the phase angle of a signal backscattered by the antenna is changed by changing the capacitance of the capacitive load.

13. The transponder according to claim 12, wherein the capacitively variable load is a controllable varactor or a CMOS varactor.

14. The transponder according to claim 1, further comprising a sensor device that is coupled to the control unit or is a part of the control unit and that supplies measured sensor data to the control unit.

15. The transponder according to claim 14, wherein the sensor device is integrated on a single semiconductor chip together with a transmitting/receiving device of the transponder.

16. The transponder according to claim 14, wherein the sensor device has at least one capacitively and/or ohmically acting sensor.

17. The transponder according to claim 14, wherein the sensor device has at least one sensor that functions as a current source and/or as a voltage source.

18. The transponder according to claim 1, further comprising an additional control unit that controls the control unit and that sets a modulation signal generated by the modulator such that the transponder can communicate with a base station.

19. The transponder according to claim 18, wherein the control unit is part of the additional control unit.

20. The transponder according to claim 1, further comprising a transmitting/receiving device that represents the external interface of the transponder, that has the antenna in the form of a transmitting/receiving antenna, and that has the modulator, wherein the transmitting/receiving antenna is provided to receive high frequency carrier signals from a base station and to transmit back appropriate response signals.

21. The transponder according to claim 20, wherein the transmitting/receiving device has an RSSI circuit for providing an RSSI voltage.

22. The transponder according to claim 20, wherein the transmitting/receiving device has a rectifier path in which a rectifying element is present to provide a rectified voltage.

23. The transponder according to claim 1, wherein the transponder is a component of an HF identification communication system or an RFID system.

24. The transponder according to claim 1, wherein the transponder is a backscatter transponder that backscatters the high-frequency carrier signals.

25. The transponder according to claim 1, wherein, in the second operating mode, the control unit controls the modulator such that based on the at least one transponder-specific parameter the reflective characteristic is changed via a control signal.

26. A transponder for a HF communication system, the transponder comprising:
an antenna for receiving high-frequency carrier signals, the antenna having reflective characteristics;
a control unit for providing transponder-specific parameters; and
a modulator being controlled by the control unit, the modulator altering the reflective characteristics of the antenna in accordance with at least one of said transponder-specific parameters, and thereby outputting signals indicating said transponder-specific parameters to a base station for evaluating the quality, performance, or functionality of the transponder,
wherein the modulator is a backscatter modulator or a load modulator, and has a capacitively variable load coupled to the antenna, and wherein a backscatter cross-section of the antenna can be changed by varying this load,
wherein the capacitive load is a micromechanical component whose capacitance varies as a function of a change in an ambient temperature and/or ambient pressure of the transponder.

27. A transponder for a HF communication system including a transmitting/receiving device functioning as a test circuit for communicating transponder-specific parameters to a base unit, the transponder comprising an antenna for receiving high-frequency carrier signals, the antenna having reflective characteristics; and wherein said transmitting/receiving device functioning as a test circuit includes:
a control unit for providing transponder-specific parameters; and
   a modulator being controlled by the control unit, the modulator altering the reflective characteristics of the antenna in accordance with at least one of said transponder-specific parameters, whereby the transponder specific parameters are communicated back to said base station, and thereby providing an indication to said base station for evaluating the quality, performance, or functionality of the transponder.

* * * * *